June 16, 1942.  R. EKSERGIAN  2,286,608
WHEEL TRUCK
Filed June 23, 1939  2 Sheets-Sheet 1
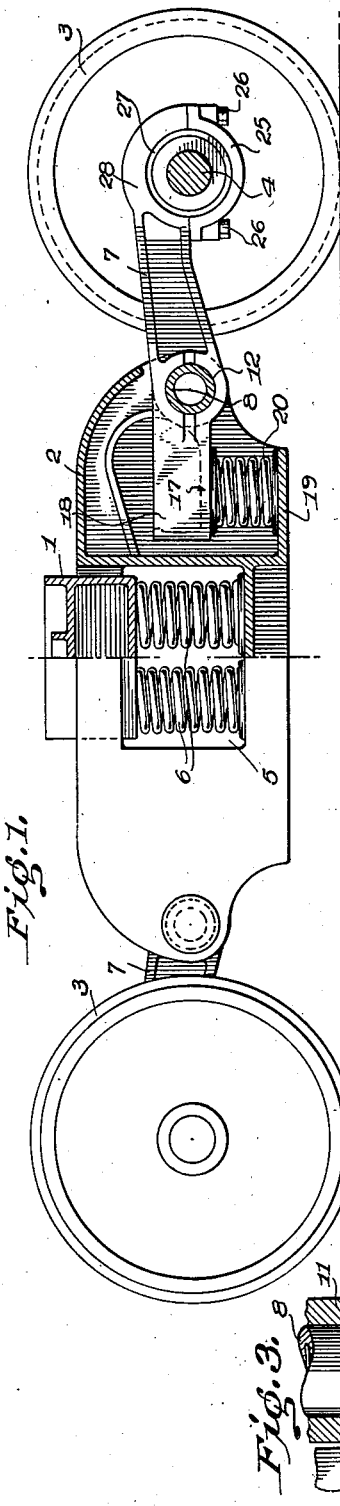
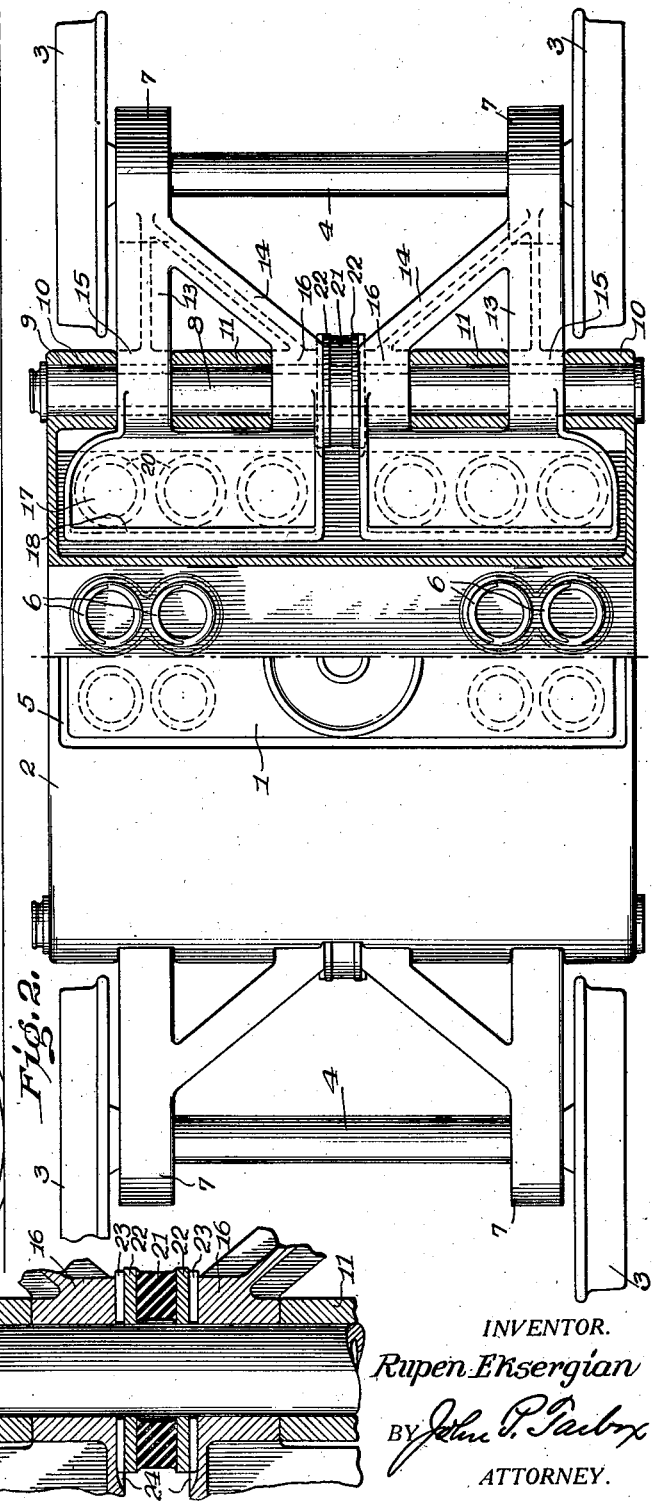
INVENTOR.
Rupen Eksergian
BY
ATTORNEY.

June 16, 1942.  R. EKSERGIAN  2,286,608
WHEEL TRUCK
Filed June 23, 1939   2 Sheets-Sheet 2
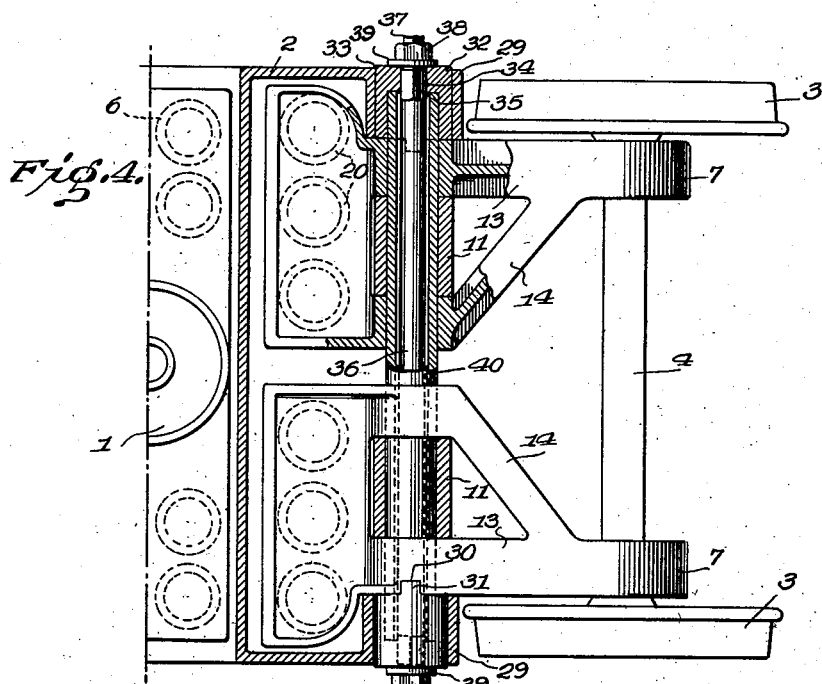
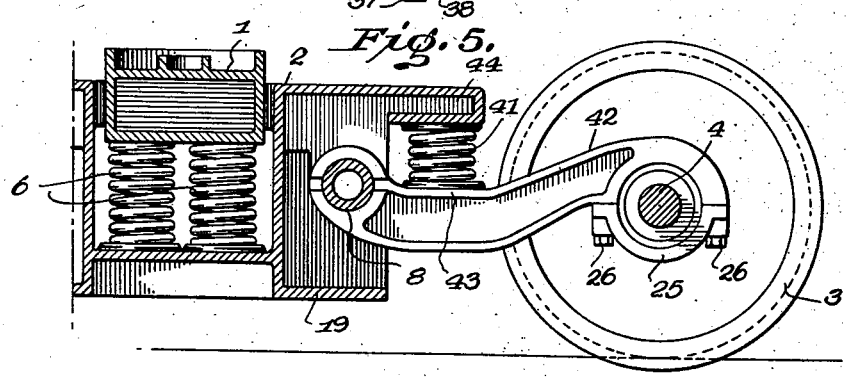
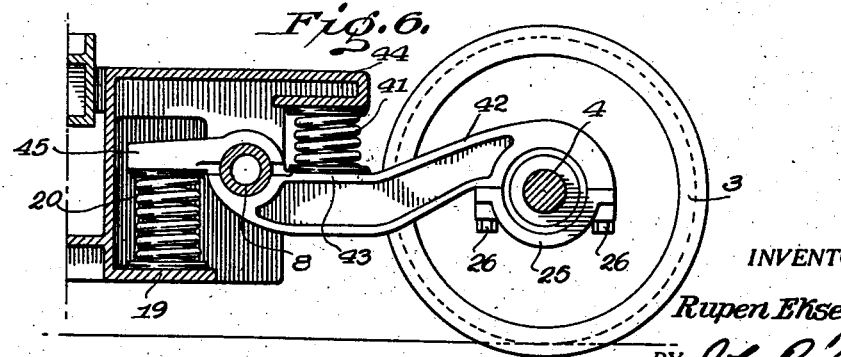
INVENTOR.
Rupen Eksergian
BY
ATTORNEY.

Patented June 16, 1942

2,286,608

UNITED STATES PATENT OFFICE 2,286,608

WHEEL TRUCK

Rupen Eksergian, Lansdowne, Pa., assignor to Edward G. Budd Manufacturing Company, Philadelphia, Pa., a corporation of Pennsylvania Application June 23, 1939, Serial No. 280,771

2 Claims. (Cl. 105—182)

The present invention relates to a wheel truck wherein each wheel is independently resiliently mounted, so that the wheels are capable of individual movements in an up and down direction, to adjust themselves to inequalities in the track or roadway.

The invention also includes the provision of a stabilizer cooperating with each pair of wheels, to permit such individual adjustments, but impose a torsional restraining moment thereon, so as to tend to keep the wheels of the pair alined with one another under normal conditions. This stabilizer may advantageously take the form of a rubber element secured to suitable means which may be connected to the said wheels. The rubber may be directly vulcanized to said means or secured in any other preferred way.

As an alternative, torsional elements may be used as stabilizers, for instance metallic rods or tubes, and if desired both the rubber and the metallic devices may be used jointly.

Other features and advantages of the invention will be understood from the present specification, wherein a preferred form is disclosed, together with several modified forms, reference being had to the accompanying drawings, forming a part thereof.

In said drawings:

Figure 1 is a partly sectional diagrammatic side elevation of a truck embodying the invention;

Fig. 2 is a plan view thereof, partly in horizontal section; and

Fig. 3 is a diagrammatic partly sectioned view of a portion thereof, showing the stabilizing disk and the parts cooperating therewith.

Fig. 4 is a diagrammatic partly sectional plan view of a portion of a modified form of truck, having a torsion rod;

Fig. 5 is a diagrammatic partly sectional side elevation of a portion of a truck, showing a modified form of spring mounting; and Fig. 6 is a view similar to Fig. 5 of a still further modification.

In all the figures, similar elements are designated by the same reference characters.

Referring first to the form disclosed in Figs. 1, 2 and 3, there is shown a bolster 1 mounted in a suitable cavity 5 in the frame 2, and resting on a number of springs such as 6, helical springs being specifically shown, although it will be understood that any suitable resilient supports may be employed.

The frame 2 serves as a carrier for the axle supporting devices 7 which are pivoted to the frame 2 and in turn carry the axles 4. A shaft 8 extends through a suitable bore 9 at each end of the frame 2, and serves as the pin of what is in substance a large hinge. The bored portions 10 and 11 of the frame 2 form the pin receiving end of one hinge member, while the two axle supporting devices 7 jointly, (on each end of the frame 2) form the other hinge member, bored as at 12 to receive the pin 8.

Each support 7 advantageously may have a straight arm 13 extending substantially at right angles to the pin 8 and also an inclined brace 14 extending at a suitable angle to reach a point near the middle of the length of said pin, so that a rigid structure results, pivoted at spaced portions 15 and 16 on said pin 8.

The said portions 15 and 16 of the support terminate in a substantially rectangular member 17 which may have an upstanding flange 18 thereon to strengthen it. The frame 2 may have a shelf such as 19 at each end and springs 20 will be interposed between said shelf and the bottom of the member 17, so that when a load is carried by the bolster 1 such load will be transferred to the wheels 3 through said springs 20. Obviously, although three helical springs have been shown under each member 17, this number is arbitrary, as is also the precise nature of resilient means used.

The wheels 3 may be mounted on suitable bearings, at the ends of the axles 4 which axles do not rotate themselves, but are mounted in universal supports in the ends of the supporting frames 7 so that it is possible for each axle 4 to tilt slightly out of parallelism with the corresponding pin 8, thus permitting the wheels 3 to adjust themselves independently of one another to slight differences of elevation of the respective rails.

These universal supports consist of portions 27 having spherical surfaces at the ends of each axle 4, carried in the correspondingly curved upper bearing 28 at the end of each support 7, and held thereto by the lower bearing members 25, which may be secured to the supports 7 by the cap screws 26.

In order to provide a stabilizing influence on such slight independent movements of the wheels, a torsional disk may be provided. This consists of a disk of rubber 21 secured to two disks of metal 22, on opposite faces thereof, as by vulcanizing it directly thereto or in any other suitable way. This structure is best shown in Fig. 3.

Each metal disk 22, which may consist of iron or steel, may have a pin or key 23 thereon, engaged in a corresponding groove or keyway 24 formed in the adjacent surface of the portion 16 of the corresponding supporting member 7.

Thus, whenever the members 7 pivot relatively to one another about the pin 8, torsional stresses will be set up in the rubber disk 21, resisting and damping such movements and tending to restore the members 7 to their normal alined relationship to one another.

Passing now to the form disclosed in Fig. 4, it will be seen that this embodiment is similar to the preceding form in many respects, and differs therefrom in substituting a torsion rod for the rubber disk.

The frame 2 here has its end lugs 29 larger than the corresponding lugs 9 of Fig. 2, but the lugs 11 are identical with the lugs 11 of Fig. 2. The supporting brackets 7 of Fig. 4 are nearly identical with those of Fig. 2, but differ therefrom in that they do not need the keyways 24, since the rubber stabilizer is not used in this form.

A further difference is that notches 30 or the like are provided on the outer portions of the arms 13, and these notches receive corresponding projections or lugs 31 on the caps 32, which are pivotally mounted in the bores 33 of lugs 29 so that said caps 32 will move jointly with the respective brackets 7.

Each cap 32 has a squared or other non-circular opening 34 in its end, to receive a correspondingly shaped end portion 35 of the torsion member 36, so that the caps 32 cannot rotate with respect to said end portions of the rod 36. Beyond these, the torsion element 36 preferably has screw threaded portions 37, cooperating with nuts 38 and lock washers 39 to secure the parts in the desired rigid connection with one another.

A pivot pin 40, here tubular, surrounds the torsion member 36 and passes through the bores in the lugs 11 and in the arms 13 and 14 of the brackets 7, to provide a pivotal or hinge connection between said brackets and the frame 2, as in the previously described form.

The axles 4 upon which the wheels 3 are mounted, are made just as in the Fig. 2 form, that is, they have universal connections with the brackets 7, to permit tilting of the axle when necessary.

The springs 20 will take the normal forces produced by the wheels in service, as in the preceding form, but when one wheel is at a different level from the other on the same axle, a twist will be given to the torsion element 36, which thus acts as a stabilizer in place of the rubber disk of the other form.

Referring now to Fig. 5, in this form the structure and action are in general similar to those of Figs. 1 to 4 with the exception that instead of providing springs 20 below the inner ends of the brackets 7, here springs 41 above said brackets are substituted.

In order to provide vertical room for these springs 41, it is preferred to change the shape of the brackets somewhat, by lengthening them and depressing them near the hinge joint. The hinge pin also may be moved closer to the bolster, because of the changed location of the springs.

The bracket 42 has therefore a depressed portion 43 adjacent the pin 8, so as to accommodate the springs 41, whose upper ends bear against the under side of a projecting end portion 44 of the frame 2. The axle 4 is supported as before, in a universal joint consisting of a bearing in the end of arm 42 and the strap 25, which are held together by screws 26.

In this embodiment either the rubber disk stabilizer or the torsion rod obviously may be provided, as preferred, or if desired both the rubber disk and the metal rod may be used jointly.

In the form shown in Fig. 6, the structure and operation are substantially the same as in Fig. 5, except that here both the springs 20 and 41 are used jointly. To make this possible, an extension 45 may be formed at the inner end of the bracket 42, to bear upon the upper ends of the springs 20, resting on the shelf 19. Here again either type of stabilizer may be used, or both jointly if preferred.

All the embodiments have certain features in common, namely, each wheel is independently resiliently supported by its own resilient means, such as a number of springs and each wheel has a limited degree of freedom to move up or down independently of its companion wheel at the other end of the axle.

Torsional stabilizers are provided in each form of device, and these may depend upon rubber or similar material, or upon a steel or other metal rod, or upon the rubber and metal jointly.

It is also obvious that the springs which support the wheels may be arranged in various ways, to accomplish the desired results.

I claim:

1. A railway truck comprising a pair of longitudinally spaced wheel and axle assemblies and a frame disposed between them, one pair of transversely spaced arms connected to each axle and being pivoted about a transversely extending axis to the truck frame, spring means associated with each arm and interposed between the frame and the arm, torsion means connecting the arms of each pair of arms and arranged concentric with the respective pivotal connection so as to stabilize the truck frame while permitting limited independent vertical movement of the opposite ends of each axle with respect to said frame, said torsion means including a rubber disc concentric with the pivots of the pairs of arms at the opposite ends of the truck and interposed between them with its lateral faces anchored to the arms, whereby the rubber is subjected to shearing stress upon relative rotation of the associated arms.

2. A railway truck comprising a pair of longitudinally spaced wheel and axle assemblies and a frame disposed between them, one pair of transversely spaced arms connected to each axle and being pivoted about a transversely extending axis to the truck frame, spring means associated with each arm and interposed between the frame and the arm, torsion means connecting the arms of each pair of arms and arranged concentric with the respective pivotal connection so as to stabilize the truck frame while permitting limited independent vertical movement of the opposite ends of each axle with respect to said frame, said torsion means including a rubber disc having plates adhesively connected such as vulcanized to the opposite sides thereof, the disc being arranged concentric with the pivots of the pairs of arms at the opposite ends of the truck and interposed between them with the plates anchored one to each of the arms to rotate therewith.

RUPEN EKSERGIAN.